United States Patent
El Husseini et al.

(10) Patent No.: US 8,892,585 B2
(45) Date of Patent: Nov. 18, 2014

(54) METADATA DRIVEN FLEXIBLE USER INTERFACE FOR BUSINESS APPLICATIONS

(75) Inventors: Ahmad Mahdi El Husseini, Kirkland, WA (US); Meyyappan Meenakshisundaram, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 13/176,120

(22) Filed: Jul. 5, 2011

(65) Prior Publication Data
US 2013/0013649 A1 Jan. 10, 2013

(51) Int. Cl.
*G06F 17/30* (2006.01)
*G06F 7/00* (2006.01)

(52) U.S. Cl.
USPC ............ 707/758; 707/790; 707/754; 707/610

(58) Field of Classification Search
CPC ....... G06Q 10/06; G06Q 10/10; G06Q 30/06; G06Q 30/02; G06F 17/30607; G06F 17/30241; G06F 17/30581; G06F 17/30893
USPC .................................. 707/758, 790, 754, 610
See application file for complete search history.

(56) References Cited

U.S. PATENT DOCUMENTS

| | | | |
|---|---|---|---|
| 7,401,094 B1 | 7/2008 | Kesler | |
| 2006/0195460 A1* | 8/2006 | Nori et al. | 707/100 |
| 2008/0162428 A1 | 7/2008 | Gaurav | |
| 2009/0171736 A1* | 7/2009 | Segler et al. | 705/8 |
| 2010/0057776 A1* | 3/2010 | Baeuerle et al. | 707/104.1 |
| 2010/0241978 A1 | 9/2010 | Genovese et al. | |

OTHER PUBLICATIONS

Yoder, et al., "Adaptive object-models for implementing business rules", Retrieved at <<http://citeseerx.ist.psu.edu/viewdoc/download?doi=10.1.1.71.5514&rep=rep1&type=pdf>>, Third Workshop on Best-Practices for Business Rules: Design and Implementation, 2001, pp. 1-10.

Devadoss, John., "Metadata-Driven User Interfaces", Retrieved at <<http://msdn.microsoft.com/en-us/library/ms954610.aspx>>, Jul. 2005, pp. 22.

"ASP.net Dynamic Data Overview", Retrieved at <<http://blogs.msdn.com/b/morebits/archive/2009/10/13/asp-net-dynamic-data-overview.aspx>>, Mar. 10, 2011, pp. 9.

Lasater, Christopher G., "Refactoring to Adaptive Object Modeling: Strategy Pattern", Retrieved at <<http://www.codeproject.com/KB/architecture/AOMStrategies.aspx>>, Jun. 20, 2005, pp. 1.

"The Metadata and Data Models in Microsoft Dynamics CRM", Retrieved at <<http://msdn.microsoft.com/en-us/library/gg309434.aspx/>>, Mar. 10, 2011, pp. 2.

"A Primer on Oracle Identity Manager 11g", Retrieved at <<http://identigov.wordpress.com/2010/07/27/a-primer-on-oracle-identity-manager-11g/>>, Mar. 11, 2011, pp. 8.

* cited by examiner

*Primary Examiner* — Kuen Lu
(74) *Attorney, Agent, or Firm* — Damon Rieth; Jim Ross; Micky Minhas (57) ABSTRACT

Business application adaptation to changes in business processes is enabled through real time modification of business application schema and metadata at runtime employing business rules to accommodate changing business processes without a need to change the underlying data and models. A business application user interface reacts to runtime changes and enforces validation and business rules as if the changes are made to the underlying structure.

20 Claims, 6 Drawing Sheets

METADATA DRIVEN FLEXIBLE USER INTERFACE FOR BUSINESS APPLICATIONS

BACKGROUND

Hosted or locally installed business applications create, monitor, and otherwise process requests, orders, quotations, and comparable business operations. Many business applications also integrate operational aspects such as manufacturing, inventory, planning, and purchasing operations, sometimes enabling interaction between suppliers and consumers of goods and services.

Business applications can be complex programs integrating a variety of modules for different tasks. In some cases, different portions of a business application may be developed by different parties including users. In other cases, such applications may be executed on one or more servers and accessed through dedicated or generic client applications (e.g., browsers). In a typical business application, the infrastructure is defined by metadata that determines how computations are to be performed, data is to be processed and presented. Business applications usually employ business rules that are defined at design time and implemented at runtime.

When a business process changes, often different business rules need to be applied and demanding a change in the schema of the data storage, as well as a resulting change in the user interface. This is done at design phase in conventional applications forcing the application to be reset or restarted. Thus, changes in business processes may become disruptive to the performance of a business application and degrade user experience.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to real time modification of business application schema and metadata at runtime through business rules to accommodate changing business processes without a need to change the underlying data and models. A business application user interface according to embodiments may react to runtime changes and enforce validation and business rules as if the changes are made to the underlying structure.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above business applications may adapt to changes in business processes through real time modification of business application schema and metadata at runtime employing business rules to accommodate changing business processes without a need to change the underlying data and models. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing business applications and/or similar business services. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
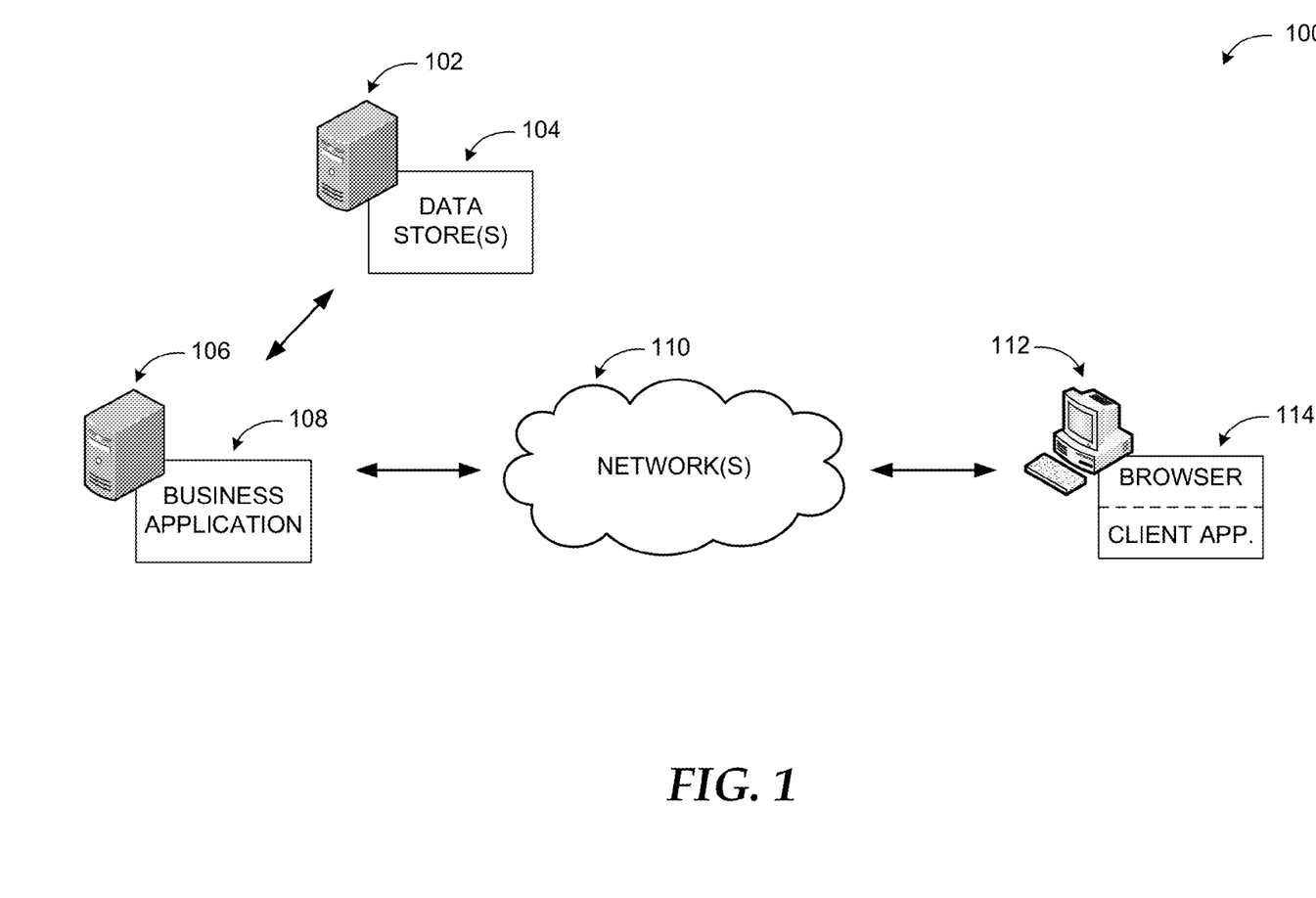
FIG. 1 illustrates a networked environment, where a business application according to some embodiments may adapt to changes in business processes by modifying schema and metadata at runtime.

Referring to FIG. 1, diagram 100 illustrates a networked environment, where a business application according to some embodiments may adapt to changes in business processes by modifying schema and metadata at runtime. The computing devices and computing environments shown in diagram 100 are for illustration purposes. Embodiments may be implemented in various local, networked, and similar computing environments employing a variety of computing devices and systems.

In an example environment illustrated in diagram 100, a client application 114 (e.g. a browser) executed on client device 112 may display a user interface (UI) to access a business application 108 executed on server 106. Business application 108 may provide services such as creating, monitoring, and otherwise processing requests, orders, quotations, and comparable business operations. Business application 108 may be associated with different aspects of business processes such as manufacturing, inventory, planning, and purchasing operations enabling interaction between suppliers and consumers of goods and services. In providing those services, business application 108 may interact with one or more data sources 104, some or all of which may be managed by server 102. Client application 114, business application 108 and data source(s) 104 may communicate over one or more networks such as network(s) 110, which may be secure or insecure, enterprise, public, wired, wireless, etc.

In a system according to embodiments, schema and metadata of the business application may be modified through business rules in response to business process changes without changing the underlying data and models. The user interface provided to a user through client application 114 may then respond to changes in schema metadata and/or data to refresh and render by rewiring the bindings. To notify the user interface about the changes, an Application Programming Interface (API) may dynamically define or modify schema/metadata related to data sources (e.g., tables, queries, objects, etc.), their relationships, and/or attributes without persisting the changes back to a data store. Thus, runtime metadata instances may be created and/or modified with a defined set of events that enable updating of the user interface at runtime as opposed to design time updates and restarting of the business application instances, which may result in disruption.

Figure 2:
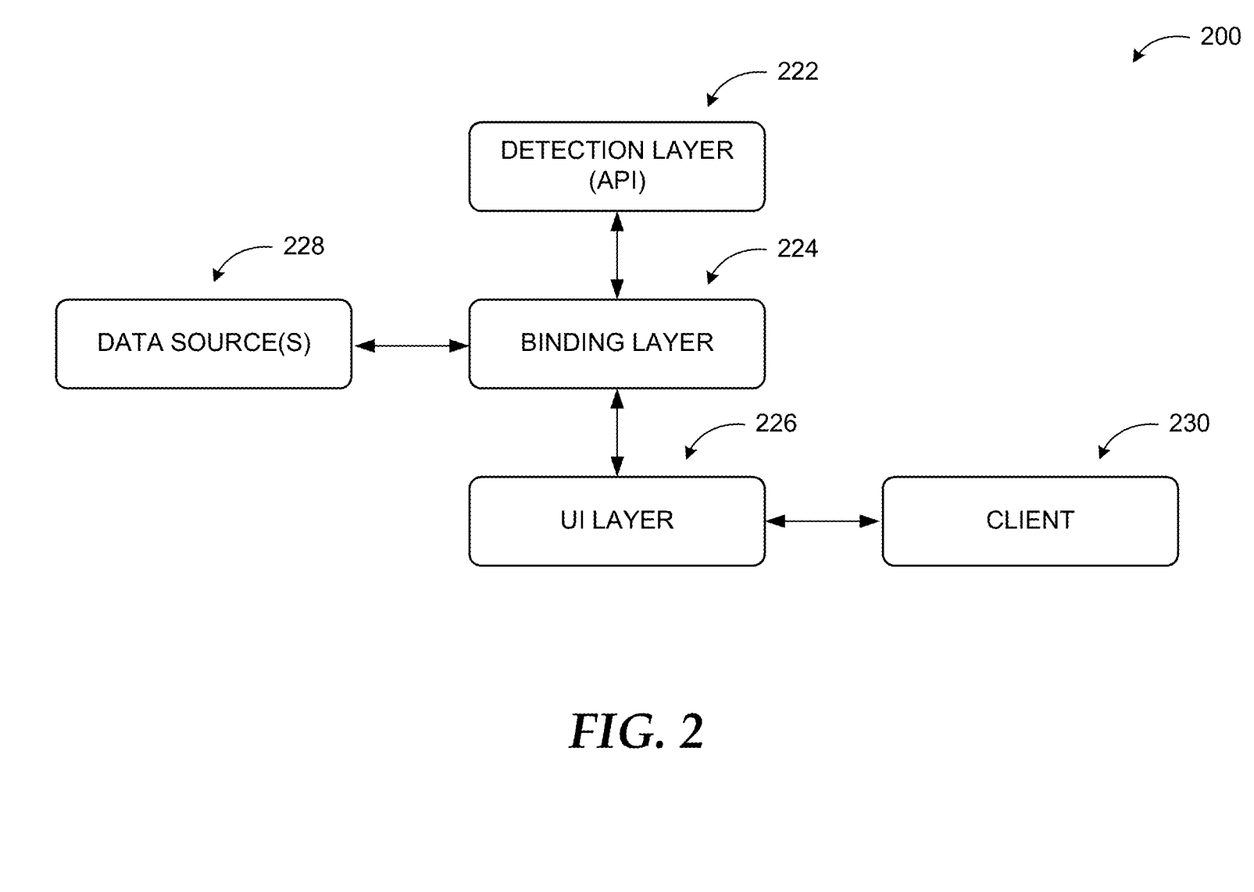
FIG. 2 illustrates example layers in a business application design for implementing metadata driven, flexible user interfaces.

FIG. 2 illustrates example layers in a business application design for implementing metadata driven, flexible user interfaces. A business application according to embodiments may encompass a wide variety of modules, layers, and configurations. Diagram 200 presents a simplified configuration of relevant layers to implement a metadata driven dynamically updateable user interface for illustration purposes.

As shown in diagram 200, a detection layer 222, for example an API, may dynamically define or modify schema/metadata related to data sources 228, their relationships, and attributes without persisting the changes back to the data store. In one example scenario, a form may be presented to a user for a business transaction (e.g., sales order, inventory analysis, invoice, and comparable ones). The form may include specific attributes such as fields, formatting, etc. depending on user attributes, data source, process, and the like. For example, specific fields may be displayed employing certain formats if the transaction is associated with a particular customer, source, or country.

Binding layer 224 may notify user interface layer 226 about the changes in the schema/metadata and enable addition/removal/modification of metadata bindings such that the user interface layer 226 can refresh itself and present the data through client application 230 with changes made based on the detected metadata/schema changes (at runtime). Thus, the user interface does not need to be updated programmatically at design time and can be modified dynamically in response to newly defined and/or modified metadata. In the above discussed example scenario, a change to a new customer, user, country may result in availability/removal/modification of particular fields and/or formatting, which may be rendered by the user interface without a design time change to the application itself.

In some implementations, the metadata in the business application may be encapsulated within a schema. The metadata within the schema may provide information about data attributes, user choices, and business application components that may be affected as a result of those user choices. Such components may include tables, fields associated with the tables, properties associated with the tables, properties associated with the fields, the required and optional relationships with other tables, queries, forms, reports, UI logic, data logic, and other application assets.

Metadata and schema to be modified (or created) by the API may be dynamically discovered. The metadata/schema parts may be stored on a local hard disk, distributed with a program suite, stored within an organization's intranet, associated with a user's web service or other cloud persona, or located on the Internet through a search engine.

Figure 3:
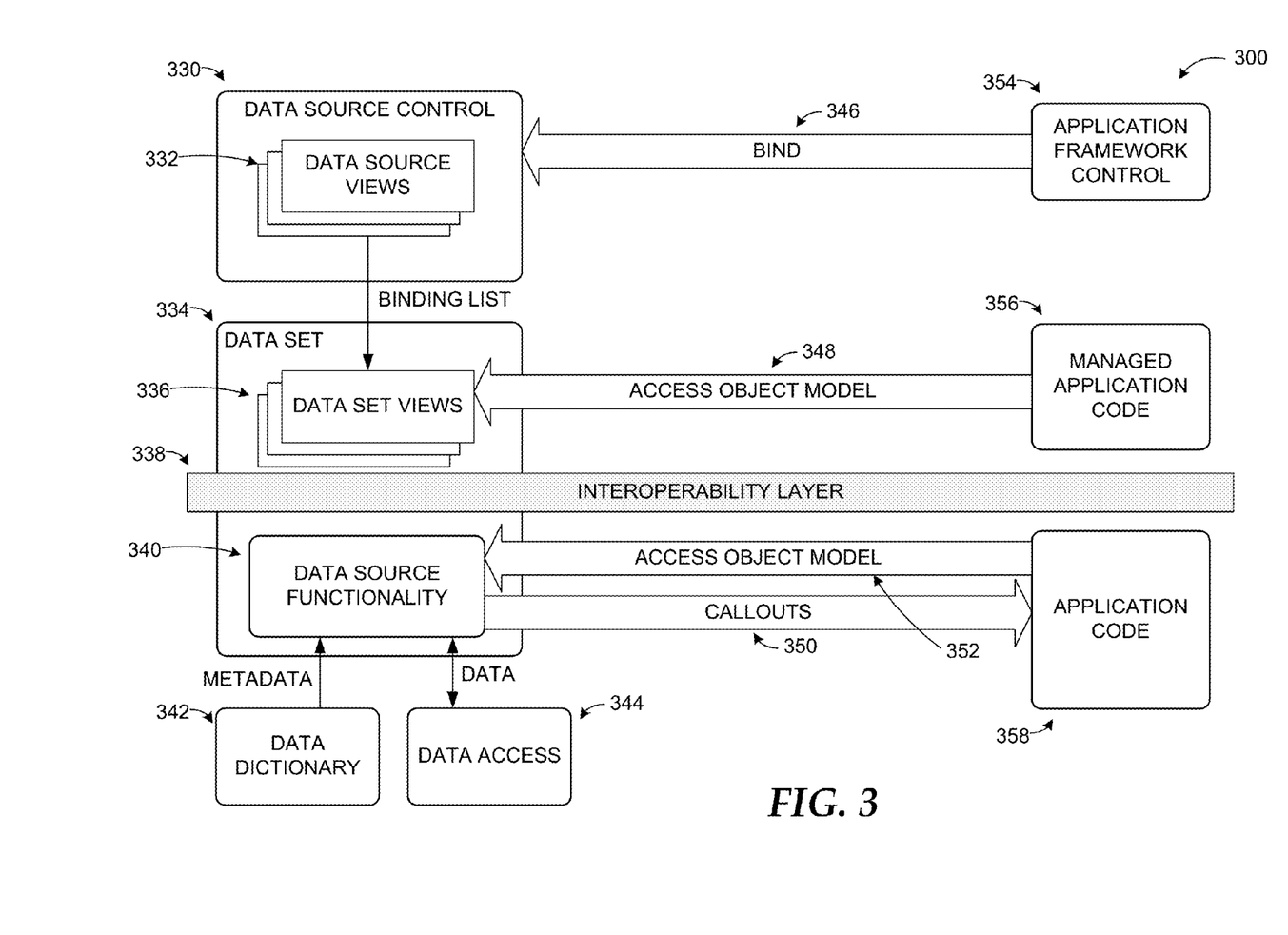
FIG. 3 illustrates major components and their interaction in a business application according to embodiments.

FIG. 3 illustrates major components and their interaction in a business application according to embodiments. The configuration and components (as well as the interactions) illustrated in diagram 300 are exemplary and do not constitute a limitation on embodiments.

In an example system as shown in diagram 300, data source control 330 may manage data source views 332, which are bound (346) by application framework control 354. An example for the application framework is ASP.NET® by Microsoft Corp. of Redmond, Wash. Such an application framework may enable programmers to build dynamic web sites, web applications and web services allowing programmers to write application code 358 using any supported language. Components of the framework may communicate through messages according to a predefined protocol such as Simple Object Access Protocol (SOAP).

Managed application code 356 on an application side of an interoperability layer 338 may employ access object model 348 for accessing data set views 336 within data set 334. Data set 334 may also include data source functionality 340 on the other side of the interoperability layer 338, which interacts with data dictionary 342 receiving metadata and data access component 344 for exchanging data. Application code 358 may access data source functionality 340 though access object model 352 and callouts 350.

As mentioned above, creation of runtime metadata instances and modification of those instances may be enabled from both managed code and kernel with a defined set of events that synchronize both interfaces. Data set 334 may employ the runtime instance and react to its changes like adding a data source with a specific join, changing a bit of a field, issuing errors if a value is not provided, etc. The data set 334 and its child objects, data sources, fields, and so on, may be manipulated from managed code. As a result, the user interface can adjust itself to reflect the changes. For example, a new data source may be added and corresponding fields automatically displayed without a developer having to write new code or edit any markup.

According to some embodiments, weakly typed schema interfaces may be tied to the runtime metadata and the published schema enabled to react to and reflect metadata changes in the kernel, in the managed code, or by the runtime (by a business logic). Events may be bubbled to the consumer layers such as a presentation grid, a bound field, and/or a form allowing relevant user interface/user interface business logic reaction to the schema and metadata changes. According to some examples, polymorphic data binding, surrogate foreign key binding, bound fields (e.g., cell trimming), and comparable items may result in forms schema changes.

The example systems in FIG. 1 through FIG. 3 are shown with specific components, program types, and configurations. Embodiments are not limited to systems according to these example configurations. Providing a metadata driven, flexible user interface for a business application may be implemented in configurations employing fewer or additional components in applications and user interfaces using the principles described herein.

Figure 4:
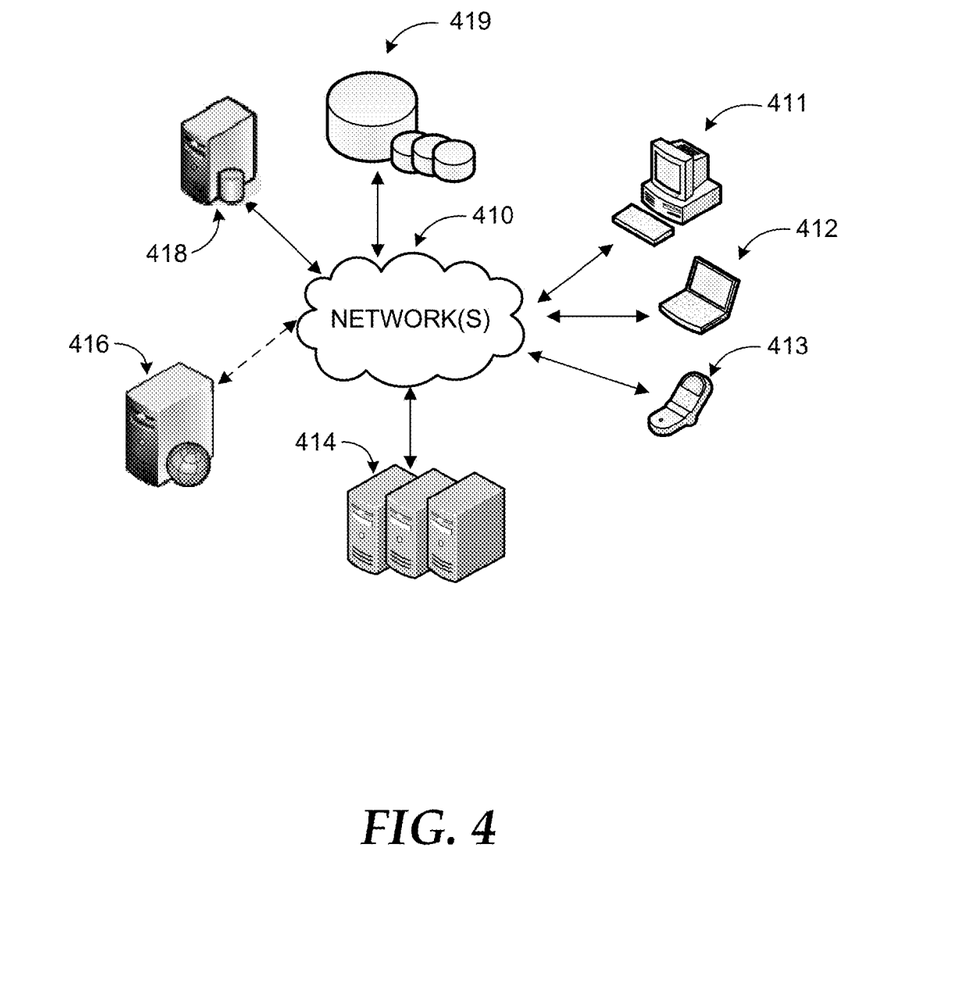
FIG. 4 is a networked environment, where a system according to embodiments may be implemented.

FIG. 4 is a networked environment, where a system according to embodiments may be implemented. Business applications may be executed over one or more servers 414 or a single server (e.g. web server) 416 such as a hosted service. A business application may communicate with client applications on individual computing devices such as a smart phone 413, a laptop computer 412, or desktop computer 411 ('client devices') through network(s) 410.

As discussed above, schema and metadata of the business application may be modified at runtime through business rules to accommodate changing business processes without a need to change the underlying data and models. A business application user interface according to embodiments may react to runtime changes and enforce validation and business rules as if the changes are made to the underlying structure.

Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to provide a business application with a metadata driven user interface that can react to process changes at runtime. Furthermore, the networked environments discussed in FIG. 4 are for illustration purposes only. Embodiments are not limited to the example applications, modules, or processes.

Figure 5:
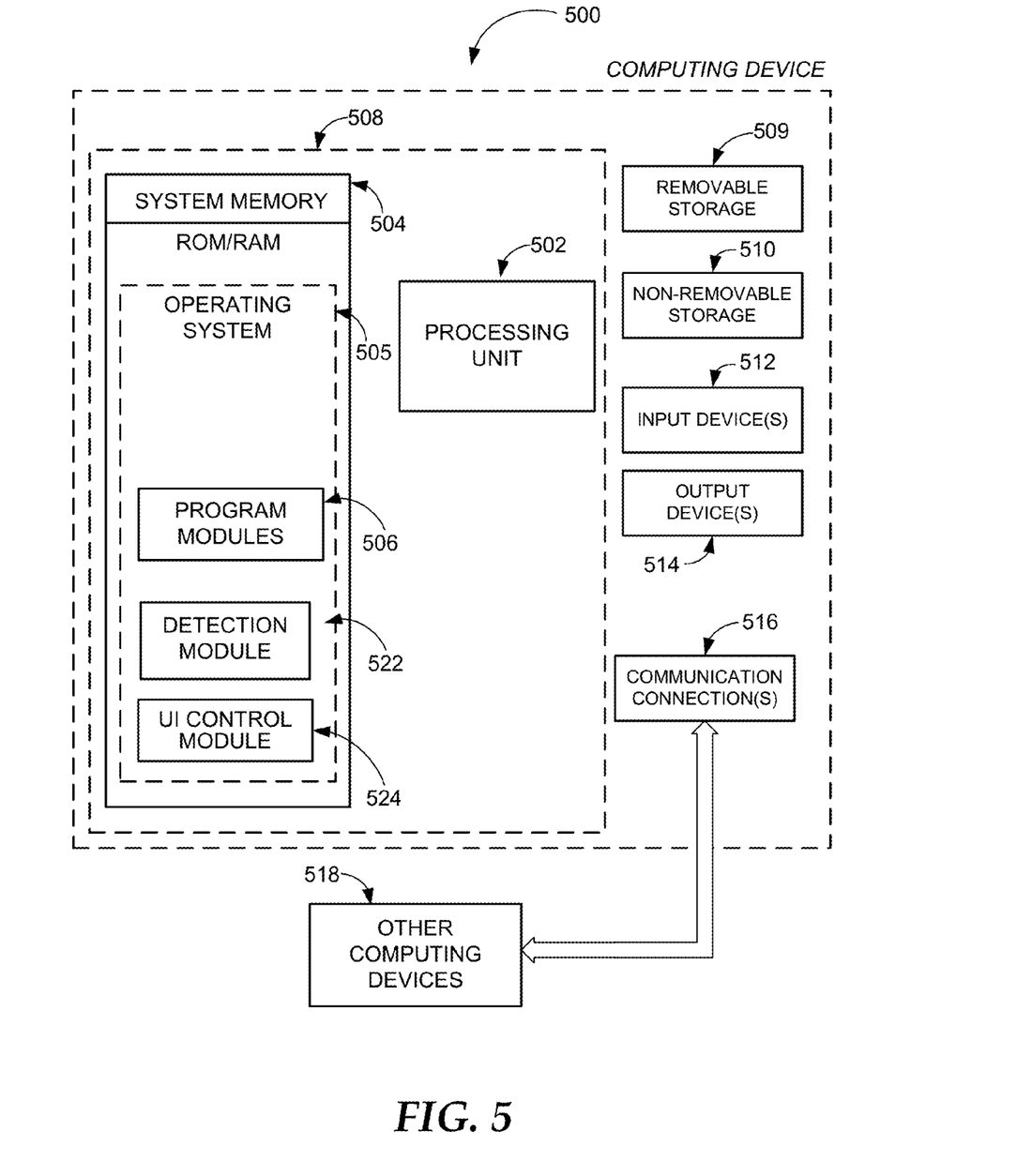
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, detection module 522, and user interface control module 524.

Detection module 522 may be part of a hosted business application and detect changes to business processes and enable modification of metadata such as addition, deletion, modification of fields. User interface control module 524 may manage the user interface for the business application and recreate itself at runtime in response to changes to the schema/metadata. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
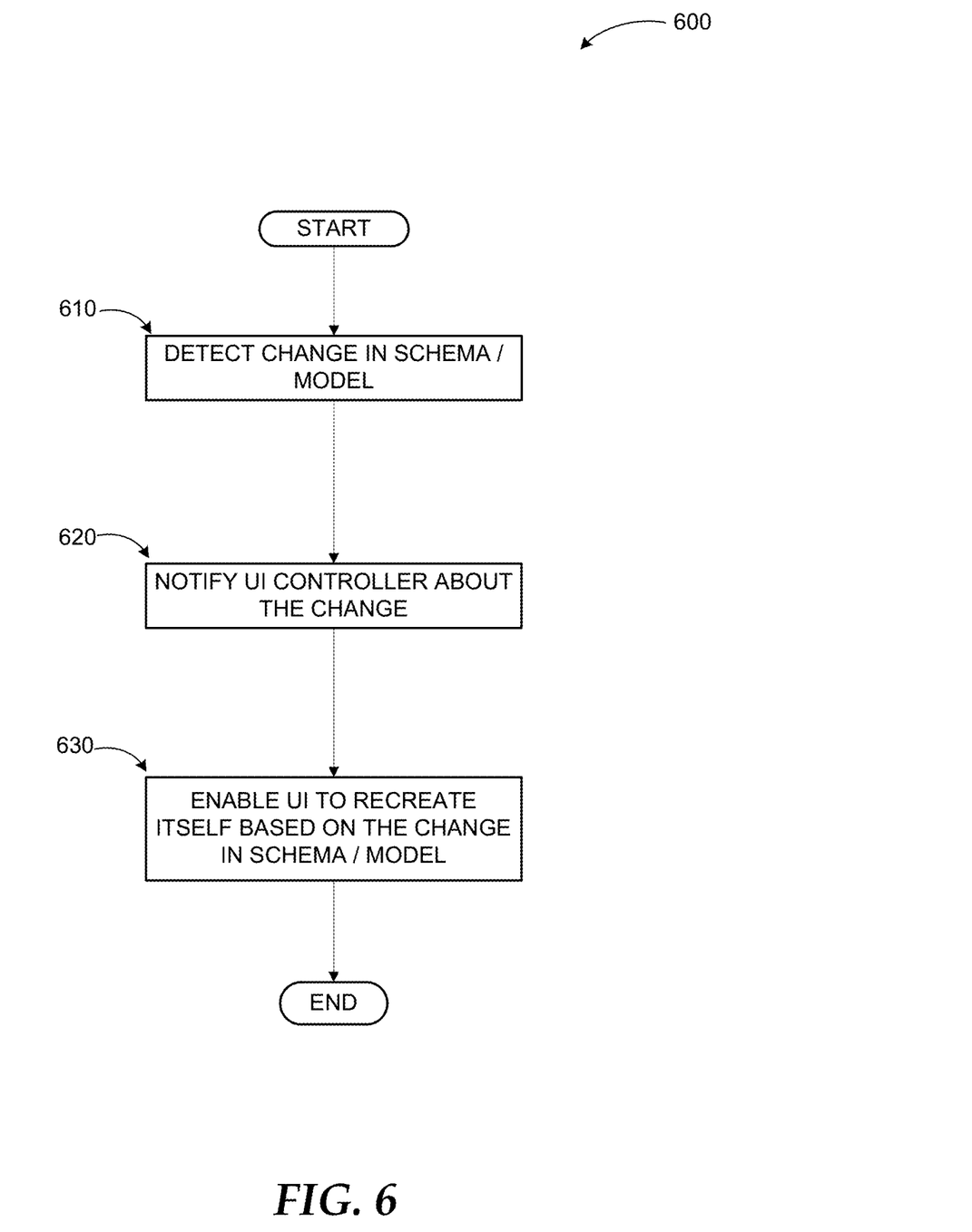
FIG. 6 illustrates a logic flow diagram for a process of providing a metadata driven user interface that can react to changes in business processes at runtime according to embodiments.

FIG. 6 illustrates a logic flow diagram for a process of providing a metadata driven user interface that can react to changes in business processes at runtime according to embodiments. Process 600 may be implemented by a business application service in some examples.

Process 600 may begin with detection of changes in a business process at a detection layer at operation 610. For example, a user may be processing a sales order, invoice, or similar form for the U.S. and then decide to process a similar form for another country (e.g., Germany), where not only formatting (e.g., currency formatting, decimal point use, date formatting, etc.) may be different, but additional or fewer fields may be associated with the form due to the difference in countries.

At operation 620, a binding layer may notify the user interface controller about the changes in the schema/metadata based on the process change. This may be followed by operation 630, where the user interface may be recreated at runtime based on the change(s) in the schema/metadata. For example, the user interface may adopt the new formatting rules, present the additional (or modified) fields, etc.

A user interface according to embodiments is not limited to presenting data to users through visual display. Other forms of presentation may include audio presentation, printouts, storage to designated data storage devices, transmission to designated targets over networks, and comparable methods.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 600 are for illustration purposes. A metadata driven user interface for business applications that can adapt to business process changes at runtime may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for providing a metadata driven, dynamically updateable user interface in a business application, the method comprising:
   detecting a change in a business process associated with the business application, wherein the process includes one or more of: manufacturing, inventory, planning, purchasing operations, and enabling an interaction between a supplier and a consumer of goods and services;
   discovering metadata and schema associated with the business process dynamically, wherein the metadata and schema are stored and located on at least one of: a local hard disk, a program suite, an organization's intranet, a user's web service, a user's cloud persona, and on the Internet through a search engine;
   at least one of creating and modifying runtime metadata instances based on the detected change at a detection layer;
   notifying a user interface layer about the detected change and the created and modified metadata at a binding layer; and
   enabling the user interface to be automatically updated at runtime based on the at least one of created and modified metadata instances at the user interface layer.

2. The method of claim 1, further comprising:
   creating and modifying the runtime metadata instances from at least one of managed code and a kernel with a predefined set of events.

3. The method of claim 1, wherein the metadata is related to at least one from a set of: data sources, data source relationships, and data source attributes.

4. The method of claim 3, wherein the data sources include at least one from a set of: tables, queries, and objects.

5. The method of claim 3, wherein the metadata is modified without persisting changes back to a data store.

6. The method of claim 1, wherein automatically updating the user interface includes at least one from a set of: adding a data source, removing a data source, adding a field, removing a field, modifying a field, and modifying a data formatting associated with a field.

7. The method of claim 1, further comprising:
   binding weakly typed schema interfaces to the runtime metadata instances.

8. The method of claim 1, further comprising:
   enabling a published schema to react to and reflect metadata changes detected in at least one from a set of: a kernel, managed code, and at runtime.

9. The method of claim 1, wherein the user interface is enabled to reflect runtime metadata instance changes in at least one from a set of: a presentation grid, a bound field, and a form.

10. The method of claim 1, wherein runtime metadata instance changes result from one of: a polymorphic data binding, a surrogate foreign key binding, and a bound field.

11. A computing device for providing a metadata driven, dynamically updateable user interface in a business application, the computing device comprising:
   a memory storing instructions; and
   a processor coupled to the memory, the processor executing the business application in conjunction with the instructions stored in the memory, wherein the business application is adapted to:
      detect a change in a business process associated with the business application at a detection module hosted at the business application;
      at least one of create and modify runtime metadata instances based on the detected change from managed code and a kernel with a predefined set of events without a need to change an underlying dataset and models;
      enable the user interface to be automatically updated at runtime based on the at least one of created and modified metadata instances by a user interface control module;
      employ an access object model for accessing data set views within a data set on an application side of an interoperability layer; and
      enable a data source on another side of the interoperability layer to interact with a data dictionary receiving metadata and a data access component for exchanging data.

12. The computing device of claim 11, wherein an Application Programming Interface (API) associated with the business application is adapted to one of define and modify a metadata schema related to at least one from a set of: data sources, data source relationships, and data source attributes.

13. The computing device of claim 11, wherein a binding layer of the business application is adapted to enable the user interface to refresh and render runtime metadata instance changes by modifying existing metadata bindings.

14. The computing device of claim 11, wherein the business application is further adapted to manipulate a data set from managed code.

15. The computing device of claim 14, wherein the data set includes at least one from a set of: child objects, data sources, and fields.

16. The computing device of claim 11, wherein the user interface is adapted to present data through at least one from a set of: visual display, audio presentation, a print out, storage to a designated data store, and transmission to a designated target through one or more networks.

17. The computing device of claim 11, wherein the business application is a hosted service and the user interface is rendered by a client application communicating with the business application over one or more networks.

18. A computer-readable memory device with instructions stored thereon for providing a metadata driven, dynamically updateable user interface in a business application, the instructions comprising:
   detecting a change in a business process associated with the business application at a detection layer configured to dynamically define and modify schema and metadata related to data sources, relationships and attributes without persisting the detected change at a data store, wherein the metadata and schema are stored and located on at least one of: a local hard disk, a program suite, an organization's intranet, a user's web service, a user's cloud persona, and on the Internet through a search engine;
   at least one of creating and modifying runtime metadata instances based on the detected change from managed code and a kernel with a predefined set of events, wherein the managed code accesses data source functionality through an object model and a callout;
   enabling the user interface to be automatically updated at runtime based on the at least one of created and modified metadata instances related to at least one from a set of: data sources, data source relationships, and data source attributes;
   employing an access object model for accessing data set views within a data set on an application side of an interoperability layer;
   enabling a data source on another side of the interoperability layer to interact with a data dictionary receiving metadata and a data access component for exchanging data; and
   rendering the automatically updated user interface by rewiring a plurality of bindings.

19. The computer-readable memory device of claim 18, wherein runtime metadata instance changes result from at least one from a set of: a polymorphic data binding, a surrogate foreign key binding, and a bound field, and are reflected by the user interface in at least one from a set of: a presentation grid, a bound field, and a form.

20. The computer-readable memory device of claim 18, wherein runtime metadata instances and associated schema to be modified are dynamically discoverable, and the schema are one of: stored on a local hard disk, distributed with a program suite, stored within an organization's intranet, associated with a user's web service, and located on the Internet through a search engine.

* * * * *